C. NOETHLICH.
Wagon Brake.
No. 77,754.
Patented May 12, 1868.
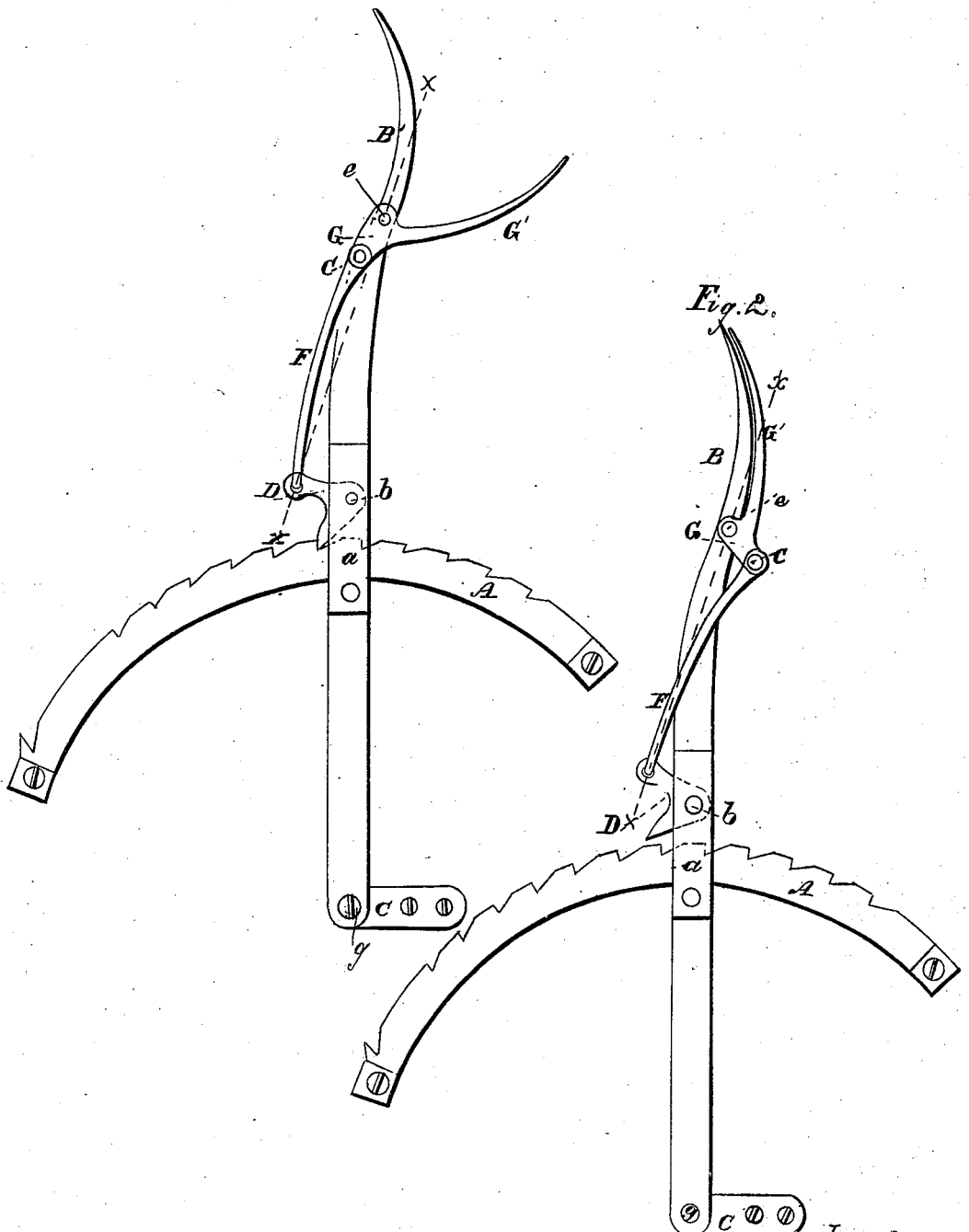

United States Patent Office.

CHARLES NOETHLICH, OF MUSCATINE, IOWA.

*Letters Patent No. 77,754, dated May 12, 1868.*

IMPROVEMENT IN WAGON-LOCK.

*The Schedule referred to in these Letters Patent and making part of the same.*

TO ALL WHOM IT MAY CONCERN:

Be it known that I, CHARLES NOETHLICH, of Muscatine, in the county of Muscatine, and State of Iowa, have invented a new and improved Wagon-Lock; and I do hereby declare that the following is a full, clear, and exact description thereof, reference being had to the accompanying drawings, making a part of this specification, in which—

Figure 1 is a side elevation of the improved wagon-lock with its lever locked.

Figure 2 is a similar view of the same parts unlocked.

Similar letters of reference indicate corresponding parts in both figures.

This invention relates to a new and improved device which is designed more particularly for operating the brake of a wagon, but which may be used to advantage for other purposes.

The nature of my invention consists in applying to the hand-lever which is connected to the brake-bar of a wagon-brake, a locking-lever and pawl, and also a segmental rack or ratchet, all of which are so constructed that while a person can with one hand disengage said pawl from the segmental ratchet, and vibrate the brake-lever, he can also engage the pawl with this segmental ratchet, and lock it in place, so that the brake-lever cannot be casually moved out of the position in which it was locked, as will be hereinafter described.

To enable others skilled in the art to understand my invention, I will describe its construction and operation.

In the accompanying drawings, A represents a segmental ratchet-bar, which is secured rigidly to the side of a wagon, and set off therefrom a short distance, so as to afford space for working a lever, B. This ratchet or rack is concentric to the axis of motion of the hand-lever B, which is pivoted at $g$ to a plate, C, secured firmly to the wagon below the segment, as shown in figs. 1 and 2.

Lever B extends up on the inner side of the segment A, above this segment, to a convenient height for a person sitting upon the seat of the wagon, and it terminates in a curved hand or foot-piece, B'. The lever B is connected to the toothed segment A by means of a staple, $a$, which prevents lateral displacement of this lever, but allows it to be vibrated in a direction with the length of said segment.

D represents a pawl, which is pivoted between the staple $a$ and lever B at $b$, and which is constructed with an arm projecting backward and upward, to which arm a rod, F, is pivoted. The upper end of this rod F is pivoted at $c$, to a link, G, which projects a hand-piece or lever, 'G', curved as shown, so that when brought in contact with the curved hand-piece B' of lever B, as shown in fig. 2, it will fit closely thereto, so that both of the portions B' and G' can be grasped by the hand, and lever B vibrated forward or backward.

The short link-connection G, which is pivoted at $e$ to the lever B, and the rod F which connects this link to the arm of pawl D, form a toggle-joint, and a means for engaging this pawl with the teeth on the upper edge of the segment A, as shown in fig. 1, and for disengaging the pawl therefrom a pleasure. When the arm or lever G' of the link is moved outward from the handle portion B', as shown in fig. 1, the pawl D will be engaged with one tooth of its segment A, and the pivot $c$ will be moved so far back of the red line $x$, that the pawl D will be locked in place, as shown in fig. 1. In this condition of the parts, lever B cannot be moved either forward or backward.

When the lever or arm G' is brought up against the curved hand-piece B' of the lever B, the pivot $c$ will have swung forward far enough to lift the nose of pawl D free from the teeth of the segment A, as shown in fig. 2, when the lever B may be vibrated forward or backward, and again locked in any desired position by dropping pawl D.

I am aware that spring-pawls and connecting-rods have been used before my invention, in conjunction with brake-levers, but a spring-pewl, or a pawl which is held in place by a spring, will allow a lever to be moved forward or in a direction with the pitch of the teeth of the segment-ratchet, and therefore such a contrivance is not safe at all times.

By my improvement a more substantial device is produced without springs, which are always liable to fail in their operation, and a positive lock can be made, which is not liable to derangement or accident, and which can be readily manipulated, and which, when locked, can neither be moved forward nor backward.

I do not claim a wagon-lock such as is shown in the patent of Thomas Urie, dated May 28, 1867; but What I do claim as my invention, and desire to secure by Letters Patent, is—

The arrangement and construction of the angular lever G G', link F, and pivoted pawl D, in combination with the bevel-toothed rack A, and vibrating-lever B B, the arrangement of the whole being such that the pivot $c$ can be thrown to the right or left of the line $x\,x$, and when in one position the pawl will be firmly locked without the aid of an auxiliary stop, and when in the other position, the pawl will be unlocked, all substantially in the manner described and shown.

CHARLES NOETHLICH.

Witnesses:
L. H. WASHBURN,
C. A. LLOYD.